United States Patent [19]
Ohgoda

[11] Patent Number: 4,861,995
[45] Date of Patent: Aug. 29, 1989

[54] RADIATION IMAGE READ-OUT APPARATUS

[75] Inventor: Makoto Ohgoda, Kanagawa, Japan

[73] Assignee: Fuji Photo Film Co., Ltd., Kanagawa, Japan

[21] Appl. No.: 172,539

[22] Filed: Mar. 24, 1988

[30] Foreign Application Priority Data

Mar. 24, 1987 [JP] Japan .................................. 62-69651

[51] Int. Cl.$^4$ .......................... G03B 42/00; G01T 1/00
[52] U.S. Cl. ............................... 250/327.2; 250/484.1
[58] Field of Search .................. 250/327.2 K, 327.2 J, 250/484.1 B

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 9/1982 | Kato et al. | 382/6 |
| 4,387,428 | 6/1983 | Ishida et al. | 364/413.13 |
| 4,687,932 | 8/1987 | Tamura et al. | 250/327.2 |
| 4,761,554 | 8/1988 | Yoshimura et al. | 250/327.2 |

FOREIGN PATENT DOCUMENTS

| | | | |
|---|---|---|---|
| 56-11395 | 2/1981 | Japan | 250/327.2 |
| 58-67240 | 4/1983 | Japan . | |
| 62-16666 | 1/1987 | Japan . | |

Primary Examiner—Constantine Hannaher
Attorney, Agent, or Firm—Sughrue, Mion, Zinn, Macpeak & Seas

[57] ABSTRACT

A radiation image read-out apparatus comprises a section for holding a cassette housing an image-recorded stimulable phosphor sheet, a section for holding a magazine housing image-recorded stimulable phosphor sheets, an image read-out section, an erasing section, and a section for holding a tray for housing erased stimulable phosphor sheets. A conveyance system is provided for conveying the stimulable phosphor sheet received from the cassette holding section to the image read-out section, the erasing section and then into the cassette, and conveying the stimulable phosphor sheet received from the magazine holding section to the image read-out section, the erasing section and then into the tray. The erasing section is shorter than the length of a single stimulable phosphor sheet. The erasing section and the tray are adjacent to each other so that the tray supports the leading edge of the stimulable phosphor sheet conveyed at the erasing section. The conveyance system conveys the erased stimulable phosphor sheet by switch-back into the cassette.

6 Claims, 3 Drawing Sheets

RADIATION IMAGE READ-OUT APPARATUS

BACKGROUND OF THE INVENTION

1. Field of the Invention

This invention relates to a radiation image read-out apparatus for use in a radiation image recording and reproducing system. This invention particularly relates to a radiation image read-out apparatus which is made small by efficient utilization of the space in the apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

As such read-out apparatuses, there has been proposed an apparatus provided with the image read-out section, the erasing section, and a cassette holding section for releasably holding a cassette which houses therein a single stimulable phosphor sheet carrying a radiation image stored thereon in the form housed in the cassette by use of an external image recording apparatus. In the proposed apparatus, the stimulable phosphor sheet is taken out of the cassette, sent to the image read-out section and the erasing section for carrying out image read-out and erasing on the stimulable phosphor sheet, and then conveyed into the empty cassette at the cassette holding section. In the case where the stimulable phosphor sheet on which the image read-out and erasing have been finished is returned in this manner into the cassette in the read-out apparatus, a loader or the like for loading the cassette with the stimulable phosphor sheet outside of the read-out apparatus prior to the next image recording step becomes unnecessary.

On the other hand, in an external image recording apparatus, besides the image recording on the stimulable phosphor sheet housed in the cassette, image recording may be carried out on a plurality of the stimulable phosphor sheets taken one by one out of a sheet feed magazine for continuous image recording or the like. The stimulable phosphor sheets each carrying a radiation image stored thereon are sequentially housed in a sheet housing magazine, which is then sent to a read-out apparatus for carrying out the image readout from the housed stimulable phosphor sheets. Therefore, the aforesaid read-out apparatus is often provided with the aforesaid cassette holding section and a magazine holding section for releasably holding the stimulable phosphor sheet magazine (i.e. the aforesaid sheet housing magazine). The stimulable phosphor sheets at the magazine holding section are taken one by one out of the stimulable phosphor sheet magazine, conveyed in the apparatus to the image read-out section and the erasing section for carrying out the image read-out and erasing on the stimulable phosphor sheets, and then sequentially conveyed into a tray held in the apparatus. The erased reusable stimulable phosphor sheets are then taken out of the apparatus in the form housed in the tray. Accordingly, the apparatus for carrying out the image read-out for both the stimulable phosphor sheet taken out of the cassette and the stimulable phosphor sheets taken out of the magazine must be provided with the cassette holding section, the magazine holding section and the tray holding section besides the image read-out section and the erasing section.

In recent years, it is required to make small the aforesaid radiation image recording and reproducing system as whole, and to make the aforesaid radiation image read-out apparatus as compact as possible for this purpose. However, with the conventional read-out apparatus, the apparatus cannot be made so small because of the provision of the conveyance path in the vicinity of the erasing section and the conveyance path from the erasing section to the cassette holding section and the tray holding section.

Specifically, in order to erase the radiation energy remaining on the stimulable phosphor sheet after the image read-out has been carried out thereon, it is necessary to expose the overall surface of the stimulable phosphor sheet to erasing light. Therefore, it is usually necessary for the erasing section to have a size not smaller than the size of a single stimulable phosphor sheet. In the case where the size of the erasing zone is smaller than the size of a single stimulable phosphor sheet, in order to carry out the erasing by moving the stimulable phosphor sheet so that the overall surface of the stimulable phosphor sheet is ultimately exposed to the erasing light, it is necessary to provide a guide means for supporting the stimulable phosphor sheet in the course of the erasing on the front and rear sides of the erasing section in the vicinity of the erasing zone. Therefore, in any case, the size of the erasing section or the size of the combination of the erasing zone with the guide means cannot always be made smaller than the length of a single stimulable phosphor sheet as viewed in the direction of conveyance of the stimulable phosphor sheet. Also, it is necessary for the stimulable phosphor sheet passing through the erasing section to be distributed and conveyed to the cassette holding section or to the tray holding section. Therefore, two conveyance paths are necessary after the passage of the stimulable phosphor sheet through the erasing section, and the apparatus becomes complicated and large.

SUMMARY OF THE INVENTION

The primary object of the present invention is to provide a radiation image read-out apparatus wherein the configuration of the apparatus is simplified by efficient utilization of the space in the vicinity of an erasing section and the apparatus as a whole is compact.

Another object of the present invention is to provide a radiation image read-out apparatus wherein the conveyance path for a stimulable phosphor sheet is simplified so that the apparatus as a whole becomes compact.

The present invention provides a radiation image read-out apparatus comprising:

(i) a cassette holding section for releasably holding a cassette which houses therein a stimulable phosphor sheet carrying a radiation image stored thereon, said cassette holding section being provided with a take-out means for taking said stimulable phosphor sheet out of said cassette, (ii) a magazine holding section for releasably holding a magazine which houses a plurality of stimulable phosphor sheets each carrying a radiation image stored thereon, said magazine holding section being provided with a take-out means for taking said stimulable phosphor sheets one by one out of said magazine, (iii) an image read-out section for carrying out radiation image read-out by scanning said stimulable phosphor sheet by a light beam which causes said stimulable phosphor sheet to emit light carrying said radiation image stored on said stimulable phosphor sheet, and detecting the emitted light, (iv) an erasing section for erasing radiation energy remaining on said stimulable phosphor sheet after the radiation image read-out from said stimulable phosphor sheet is finished at said image read-out section, (v) a tray holding section for releasably holding a tray for holding therein a plurality of said stimulable phosphor sheets on which the erasing has been finished, and (vi) a stimulable phosphor sheet conveyance means for:

(a) receiving the stimulable phosphor sheet from said take-out means at said cassette holding section, conveying said stimulable phosphor sheet to said image read-out section and said erasing section, and then conveying said stimulable phosphor sheet into said cassette at said cassette holding section or into said tray at said tray holding section, and (b) receiving the stimulable phosphor sheet from said take-out means at said magazine holding section, conveying said stimulable phosphor sheet to said image read-out section and said erasing section, and then conveying said stimulable phosphor sheet into said tray at said tray holding section or into said cassette at said cassette holding section, wherein the length of said erasing section in the direction of conveyance of said stimulable phosphor sheet is shorter than the length of a single stimulable phosphor sheet, said erasing section and said tray at said tray holding section are provided adjacent to each other so that said tray supports the leading edge of said stimulable phosphor sheet conveyed at said erasing section, and said stimulable phosphor sheet conveyance means conveys said stimulable phosphor sheet, on which the erasing has been finished, by switch-back into said cassette at said cassette holding section.

With the radiation image read-out apparatus in accordance with the present invention wherein the length of the erasing section is adjusted to be shorter than the length of a single stimulable phosphor sheet and the tray is provided adjacent the erasing section, the erasing section itself can be made small, and the tray can be utilized for the housing of the erased reusable stimulable phosphor sheet and as a guide for the stimulable phosphor sheet in the course of the erasing. Therefore, the tray can be accommodated in the space which has heretofore been necessary for the erasing alone. Also, after the erasing is finished for the stimulable phosphor sheet, the stimulable phosphor sheet is directly conveyed from the erasing section into the tray in the case where the stimulable phosphor sheet is to be housed in the tray, or is conveyed by switch-back from the erasing section to the cassette holding section in the case where the stimulable phosphor sheet is to be conveyed into the cassette at the cassette holding section. Therefore, it is not necessary for the conveyance path for conveying the stimulable phosphor sheet from the erasing section to the cassette and the conveyance path for conveying the stimulable phosphor sheet to the tray to be provided independently of each other, and the conveyance path can be simplified. Accordingly, with the radiation image read-out apparatus in accordance with the present invention, the configuration of the erasing section and the configuration in the vicinity of the erasing section can be made small and simple, and the apparatus as a whole can be made compact.

DESCRIPTION OF THE PREFERRED EMBODIMENTS

The present invention will hereinbelow be described in further detail with reference to the accompanying drawings.

Figure 1:
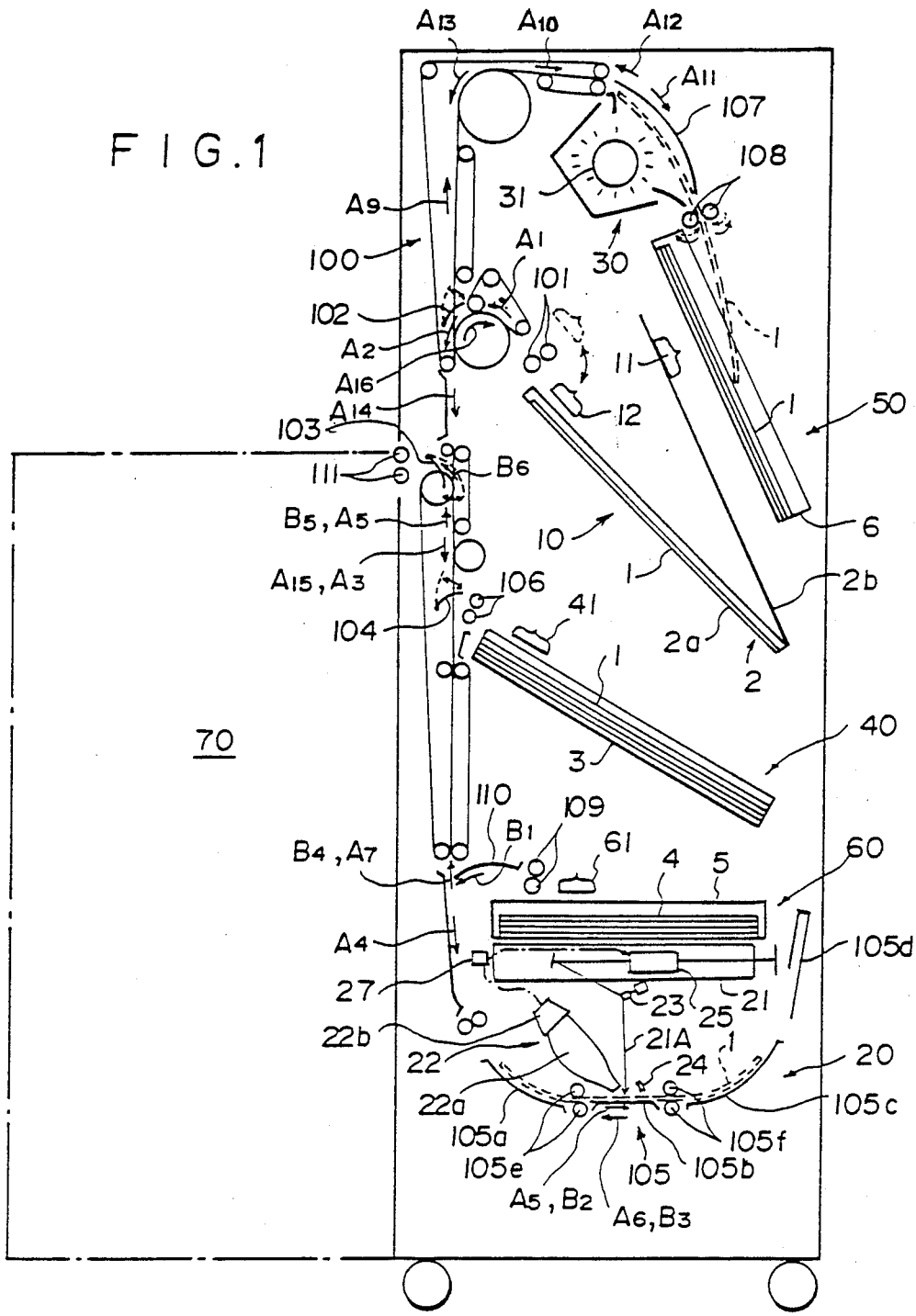
FIG. 1 is a schematic side view showing an embodiment of the radiation image read-out apparatus in accordance with the present invention.

With reference to FIG. 1, an embodiment of the radiation image read-out apparatus in accordance with the present invention is provided with a cassette holding section 10 for releasably holding a cassette 2 capable of housing a stimulable phosphor sheet 1 therein, a magazine holding section 40 for releasably holding a magazine 3 capable of housing therein a plurality of stimulable phosphor sheets 1, 1 . . . , an image read-out section 20 for reading out a radiation image stored on the stimulable phosphor sheet 1, an erasing section 30 for erasing radiation energy remaining on the stimulable phosphor sheet 1 after image read-out therefrom is finished at the image read-out section 20, and a tray holding section 50 for releasably holding a tray 6 capable of housing therein a plurality of stimulable phosphor sheets 1, 1 . . . on which the erasing has been finished at the erasing section 30. The sections 10, 20, 30, 40, and 50 are approximately aligned with one another in the vertical direction, and a stimulable phosphor sheet conveyance means 100 for conveying the stimulable phosphor sheet 1 to these sections is provided beside the sections. This embodiment is also constituted for carrying out reproduction of the radiation image, which has been read out at the image read-out section 20, on a recording sheet in the same apparatus. Specifically, in general, the radiation image which has been read out at the image read-out section in the image read-out apparatus is reproduced as a visible image by, for example, scanning the recording sheet with a light beam modulated in accordance with the image signals detected at the image readout section and recording the radiation image on the recording sheet. The reproducing apparatus for the image reproduction has heretofore been provided independently of the read-out apparatus. However, in the case where the components constituting the reproducing apparatus are provided in horizontal relation to the sheet conveyance means, thereby to form the image read-out section and the reproducing apparatus integrally with each other, the radiation image recording and reproducing system as a whole can be made smaller. Accordingly, in this embodiment, a recording sheet feeding section 60 for releasably holding a recording sheet feed magazine 5 which houses therein a plurality of recording sheets 4, 4 . . . is connected with the stimulable phosphor sheet conveyance means 100, and the image read-out section 20 is constituted for acting in the same manner as the image reproducing section for reproducing the radiation image on the recording sheet 4 as will be described later.

The stimulable phosphor sheet 1 has been subjected to image recording in an external image recording apparatus (not shown) in the form housed in the cassette 2, and the cassette 2 housing the image-recorded stimulable phosphor sheet 1 is fed to the cassette holding section 10. The cassette 2 is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 7 is to be housed and an openable cover member 2b. When the cassette 2 is fed into the cassette holding section 10, the cover member 2b is maintained in the closed position. When the stimulable phosphor sheet 1 is to be taken out of the cassette 2 at the cassette holding section 10, the cover member 2b is opened as shown by a cover opening means 11 constituted by a suction cup or the like. After the cover member 2b is opened, a stimulable phosphor sheet take-out means 12 constituted by a suction cup or the like advances into the cassette 2, and sucks and takes the stimulable phosphor sheet 1 out of the cassette 2. The stimulable phosphor sheet take-out means 12 then transfers the stimulable phosphor sheet 1 to nip rollers 101 constituting a part of the stimulable phosphor sheet conveyance means 100 in the vicinity of the cassette 2. The stimulable phosphor sheet 1 has been housed in the cassette 2 with its front surface provided with a stimulable phosphor layer facing down.

The stimulable phosphor sheet conveyance means 100 is composed of endless belts, guide plates, rollers, and sheet distributing means. The stimulable phosphor sheet 1 whose leading edge portion is grasped between the nip rollers 101 is conveyed by the stimulable phosphor sheet conveyance means 100 in the direction as indicated by the arrow A1, guided by the sheet distributing means 102 positioned as indicated by the solid line in FIG. 1, and conveyed in the direction as indicated by the arrow A2. The stimulable phosphor sheet 1 is then conveyed in the directions as indicated by the arrows A3 and A4 to the image read-out section 20. Sheet distributing means 103 and 104 provided in the conveyance path are maintained respectively at the positions as indicated by the solid line and the broken line in FIG. 1, and allow the stimulable phosphor sheet 1 to be conveyed downward.

As for the stimulable phosphor sheet 1, the image read-out section 20 is operated for scanning the stimulable phosphor sheet 1 carrying a radiation image stored thereon by a laser beam 21A as stimulating rays which cause the stimulable phosphor sheet 1 to emit light in proportion to the stored radiation energy, and photoelectrically detecting the emitted light by a photoelectric read-out means 22 constituted by a photomultiplier or the like to obtain electric image signals for use in reproduction of a visible image. Reference numeral 21 denotes, by way of example, a He-Ne laser beam source, and reference numeral 23 denotes a light deflector such as a galvanometer mirror. Reference numeral 24 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like. Reference numeral 25 denotes a light modulator such as an acousto-optic modulator (AOM), which is not activated when the laser beam 21A scans the stimulable phosphor sheet 1.

The stimulable phosphor sheet 1 sent to the image read-out section 20 is conveyed by a sub-scanning means 105 composed of guide plates 105a, 105b, 105c and 105d, and nip rollers 105e and 105f as a part of the stimulable phosphor sheet conveyance means 100 in the direction as indicated by the arrow A5, and the overall surface of the stimulable phosphor sheet 1 is scanned two-dimensionally by the laser beam 21A deflected approximately normal to the direction of conveyance and caused by the laser beam 21A to emit light in proportion to the stored radiation energy. The light emitted by the stimulable phosphor sheet 1 in the course of the scanning is photoelectrically detected by the photodetector 22b via the light guide member 22a. The emitted light is converted by the photodetector 22b into electric image signals, and the electric signals thus obtained are sent to an image processing circuit 27 for carrying out image processing on the electric signals. After the image read-out from the overall surface of the stimulable phosphor sheet 1 is finished, the leading edge of the stimulable phosphor sheet 1 contacts a guide plate 105d with the tailing edge thereof being grasped between nip rollers 105f. From this position, the stimulable phosphor sheet 1 is switched back and conveyed in the direction as indicated by the arrow A6.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary readout may be conducted by scanning the stimulable phosphor sheet 1 with stimulating rays having stimulation energy of a level lower than the level of the stimulation energy of the laser beam (stimulating rays) used in the final read-out, and detecting the light emitted by the stimulable phosphor sheet 1 in the course of the scanning by a photoelectric read-out means.

The image read-out section 20 may be constituted to carry out only the final read-out or both the preliminary read-out and the final read-out. For example, the preliminary read-out may be carried out by conveying the stimulable phosphor sheet 1 in the direction as indicated by the arrow A5, the stimulable phosphor sheet 1 may then be the switched back and reversely conveyed in the direction as indicated by the arrow A6 to the read-out start position, and then the final read-out may be carried out while the stimulable phosphor sheet 1 is again conveyed in the direction as indicated by the arrow A5. The optical members at the image read-out section 20 are not limited to those as mentioned above. For example, as proposed in Japanese Unexamined Patent Publication No. 62(1987)-16666, a long photomultiplier may be disposed along the main scanning line as the photoelectric read-out means for detecting the light emitted by the stimulable phosphor sheet 1.

On the other hand, the image read-out section 20 carries out the image read-out in the same manner as mentioned above also for stimulable phosphor sheet 1 taken out of the magazine holding section 40. At the magazine holding section 40, a sheet take-out means 41 constituted by a suction cup or the like takes the stimulable phosphor sheets 1, 1 . . . one by one out of the magazine 3, and transfers them to nip rollers 106 in the vicinity of the sheet take-out means 41. The stimulable phosphor sheet 1 thus taken out of the magazine 3 is guided by the sheet distributing means 104 moved to the position as indicated by the solid line in FIG. 1, and conveyed by the stimulable phosphor sheet conveyance means 100 to the image read-out section 20.

After the image read-out from the stimulable phosphor sheet 1 is finished at the image read-out section 20, the stimulable phosphor sheet 1 is conveyed by the stimulable phosphor sheet conveyance means 100 in the directions as indicated by the arrows A7, A8, A9 and A10 into the erasing section 30. At this time, the sheet distributing means 102 and 104 are maintained at the positions as indicated by the broken lines in FIG. 1, and the sheet distributing means 103 is maintained at the position as indicated by the solid line.

At the erasing section 30, radiation energy remaining on the stimulable phosphor sheet 1 after the image read-out therefrom is finished is erased (i.e. released). Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 1 is exposed to the erasing light emitted by the erasing light sources 31, 31, . . . for releasing the residual radiation energy from the stimulable phosphor sheet 1 while the stimulable phosphor sheet 1 is conveyed along a guide plate 107 in the direction as indicated by the arrow A11. At the erasing section 30, any known erasing method may be used. For example, erasing may be conducted by heating or by a combination of exposure to the erasing light with heating.

The length of the erasing section 30 in the direction of conveyance of the stimulable phosphor sheet is approximately one-half the length of a single stimulable phosphor sheet. The tray holding section 50 is disposed below the erasing section 30, and the tray 6 at the tray holding section 50 is held adjacent the erasing section 30 so that the tray 6 can support the leading edge portion of the stimulable phosphor sheet 1 erased by being conveyed in the direction as indicated by the arrow A11 at the erasing section 30. At the erasing section 30, the stimulable phosphor sheet 1 is conveyed in the direction as indicated by the arrow A11 along a guide plate 107, and the leading edge of the stimulable phosphor sheet 1 advances into the tray 6 and guided by the tray 6. Exposure of the overall surface of the stimulable phosphor sheet 1 to the erasing light is completed at the time the stimulable phosphor sheet 1 comes to the position as indicated by the broken line in FIG. 1. In the case where the stimulable phosphor sheet 1 is the one that was fed out of the magazine 3, nip rollers 108 for grasping the stimulable phosphor sheet 1 are further rotated in the directions as indicated by the solid-line arrows to advance the stimulable phosphor sheet 1 into the tray 6. At the time the tailing edge of the stimulable phosphor sheet 1 has separated from the nip rollers 108, the stimulable phosphor sheet 1 falls by its weight and is housed in the tray 6. On the other hand, in the case where the stimulable phosphor sheet 1 is the one that was fed out of the cassette 2, the stimulable phosphor sheet 1 is switched back and conveyed into the empty cassette 2 at the cassette holding section 10. Specifically, when the erasing has been finished in the manner as mentioned above, the nip rollers 108 are rotated reversely in the directions as indicated by the broken-line arrows to convey the stimulable phosphor sheet 1 reversely in the direction as indicated by the arrow A12. The stimulable phosphor sheet 1 is further conveyed by the stimulable phosphor sheet conveyance means 100 in the direction as indicated by the arrow A13, made to pass over the sheet distributing means 102 maintained at the position as indicated by the broken line and the sheet distributing means 103 maintained at the position as indicated by the solid line, and thus conveyed in the directions as indicated by the arrows A14 and A15. The stimulable phosphor sheet 1 conveyed downward in this manner is then switched back upward, and conveyed in the direction as indicated by the arrow A16 into the cassette 2 by being guided by the sheet distributing means 102 moved to the position as indicated by the solid line. The stimulable phosphor sheet 1 is thus switched back upward after being conveyed downward, so that the surface of the stimulable phosphor sheet 1 provided with the stimulable phosphor layer faces down at the time the stimulable phosphor sheet 1 is housed in the cassette 2. The cassette 2 loaded with the erased reusable stimulable phosphor sheet 1 in this manner is taken out of the apparatus and sent to the image recording step.

On the other hand, this embodiment is constituted for carrying out, besides the aforesaid image read-out and erasing, reproduction of the read-out radiation image on the recording sheet 4. Reproduction of the radiation image in this embodiment will be described hereinbelow.

At the time the image read-out from the stimulable phosphor sheet 1 has been finished at the image read-out section 20 and the stimulable phosphor sheet 1 has been conveyed out of the image read-out section 20, a single recording sheet 4 is taken by a suction means 61 out of the recording sheet feed magazine 5 at the recording sheet feeding section 60, and transferred to nip rollers 109 in the vicinity of the recording sheet feeding section 60. The recording sheet 4 is conveyed by the nip rollers 109 along a guide plate 110 in the direction as indicated by the arrow B1, and is then conveyed by the stimulable phosphor sheet conveyance means 100 into the image read-out section 20 in the same manner as the stimulable phosphor sheet 1. At the image read-out section 20, the radiation image which was read from the stimulable phosphor sheet 1 in the manner as mentioned above is recorded on the recording sheet 4 while the recording sheet 4 is being conveyed by the aforesaid sub-scanning means 105 in the direction as indicated by the arrow B2.

At the time the recording sheet 4 is thus conveyed in the image read-out section 20, the light modulator 25 is operated in accordance with the image signals which were detected from the stimulable phosphor sheet 1, and the operation of the photodetector 22b is stopped. The recording sheet 4 is scanned by the laser beam 21A now acting as the recording light modulated by the light modulator 25 and deflected by the light deflector 23, so that the radiation image which was stored on the stimulable phosphor sheet 1 is reproduced over the overall surface of the recording sheet 4.

After the image reproduction on the recording sheet 4 is finished at the image read-out section 20, the recording sheet 4 is conveyed by the stimulable phosphor sheet conveyance means 100 in the directions as indicated by the arrows B3, B4 and B5. At this time, the sheet distributing means 104 is maintained at the position as indicated by the broken line, and the sheet distributing means 103 is moved to the position as indicated by the broken line, thereby to guide the recording sheet 4 in the direction as indicated by the arrow B6 and to have the leading edge of the recording sheet 4 grasped between ejection rollers 111. By way of example, the ejection rollers 111 may convey the recording sheet 4 to an automatic developing section 70 connected to the read-out apparatus. Alternatively, a tray or the like may be positioned close to the ejection rollers 111, and the recording sheets 4, 4, . . . may be sequentially ejected into the tray or the like. Also, a holding section for the recording sheet housing tray may be provided inside of the read-out apparatus, and the recording sheets 4, 4, . . . may be taken out of the apparatus in the form housed in the tray and sent to an external automatic developing machine.

At the image read-out section 20, the reproduction of the radiation image read out from a single stimulable phosphor sheet 1 is carried out on a single recording sheet 4 immediately after the image read-out is carried out on the stimulable phosphor sheet 1. Instead, the image read-out may be carried out continuously for a plurality of the stimulable phosphor sheets at the image read-out section 20, image signals thus detected may be stored in a memory, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets. Also, from the viewpoint of making the apparatus small and reducing the manufacture cost thereof, the image read-out section 20 should preferably be formed integrally with the image reproducing section by utilizing the conveyance means and the laser beam scanning system in common in the manner as mentioned above. However, the image reproducing section may be formed besides the stimulable phosphor sheet conveyance means independently of the image read-out section.

With the aforesaid embodiment wherein the length of the erasing section is adjusted to be smaller than the length of the stimulable phosphor sheet and the tray is provided adjacent the erasing section, the tray can be utilized as a means for housing the erased reusable stimulable phosphor sheet and as a guide for the stimulable phosphor sheet in the course of the erasing. Therefore, the erasing section can be made small, the tray can be accommodated in the space which has heretofore been required only for carrying out the erasing, and the apparatus can be made compact. Also, in the case where the tray is utilized as the guide for the stimulable phosphor sheet in the course of the erasing, the conveyance for returning the erased reusable stimulable phosphor sheet to the cassette holding section should preferably be achieved by switch-back. Accordingly, the aforesaid embodiment is constituted for conveying the stimulable phosphor sheet from the erasing section to the cassette holding section by switch-back, thereby to simplify the conveyance system for the stimulable phosphor sheet.

Figure 2:
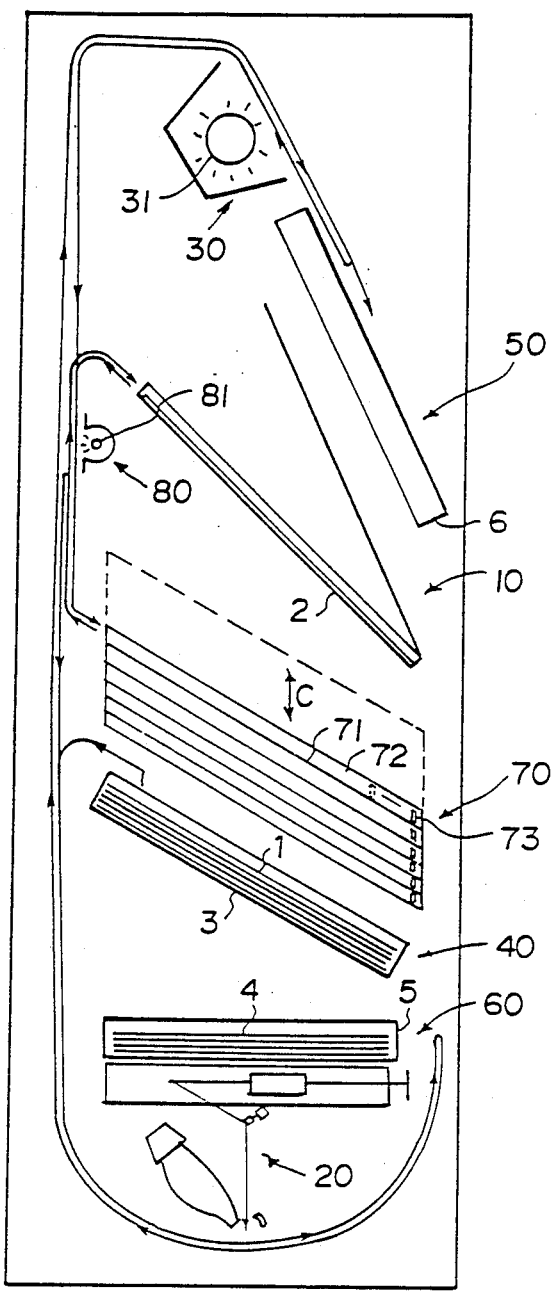
FIGS. 2 and 3 are schematic views showing further embodiments of the radiation image read-out apparatus in accordance with the present invention.

FIG. 2 shows another embodiment of the radiation image read-out apparatus in accordance with the present invention wherein a stacker 70 for housing therein a plurality of stimulable phosphor sheets and discharging them one by one is provided between the cassette holding section 10 and the magazine holding section 40. With this configuration, processing of the stimulable phosphor sheets can be achieved more efficiently. The function of the stacker 70 and the apparatus provided with the stacker 70 will be described hereinbelow with reference to FIG. 2. In FIG. 2, similar elements are numbered with the same reference numerals with respect to FIG. 1.

A comparatively long time is taken for carrying out the image read-out at the image read-out section 20, and therefore it often occurs that processing of the stimulable phosphor sheets cannot be achieved efficiently in the case where a cassette 2 housing a new image-recorded stimulable phosphor sheet 1 is loaded to the cassette holding section 10 after processing of he preceding stimulable phosphor sheet 1 is finished at the image read-out section 20. Accordingly, the embodiment shown in FIG. 2 s provided with the stacker 70, so that the stimulable phosphor sheet 1 fed out of the cassette holding section 10 may be conveyed into the stacker 70 and made to wait for conveyance to the image read-out section 20 in accordance with the condition of the image readout section 20.

The stacker 70 comprises a plurality of stimulable phosphor sheet housing compartments 72, 72, . . . defined by partitions 71, 71, . . . and is moveable vertically in the direction as indicated by the arrow C between the position as indicated by the solid line in FIG. 2 and the position as indicated by the broken line, so that every stimulable phosphor sheet housing compartment 72 can face the sheet conveyance means (not shown in FIG. 2) disposed in the vicinity of the stacker 70. In the course of conveying the stimulable phosphor sheet 1 fed out of the cassette holding section 10 into the stacker 70, the stacker 70 is moved until a predetermined stimulable phosphor sheet housing compartment 72 is brought adjacent the sheet conveyance means, and then the stimulable phosphor sheet 1 is conveyed into the stacker 70. After the tailing edge of the stimulable phosphor sheet 1 separates from the sheet conveyance means, the stimulable phosphor sheet 1 falls by its weight and is held with its leading edge contacting a stopper 73 in the stimulable phosphor sheet housing compartment 72. When the stimulable phosphor sheet 1 is to be fed out of the stacker 70, the stacker 70 is moved until the stimulable phosphor sheet housing compartment 72 in which the stimulable phosphor sheet 1 is housed is brought adjacent the sheet conveyance means, the stopper 73 is then moved to the position as indicated by the broken line to push up the stimulable phosphor sheet 1 and to transfer the leading edge of the stimulable phosphor sheet 1 to the sheet conveyance means. The stimulable phosphor sheet 1 is conveyed upward in the direction as indicated by the arrow, and is then switched back downward and conveyed into the image read-out section 20. In the case where the stimulable phosphor sheet 1 taken out of the cassette 2 is temporarily housed in the stacker 70 in this manner, a new cassette can be fed to the cassette holding section 10 and a stimulable phosphor sheet can be taken out of the new cassette while processing of the preceding stimulable phosphor sheet 1 is being carried out at the image read-out section 20. Also, the stimulable phosphor sheet can be sent to the image read-out section 20 immediately after processing of the preceding stimulable phosphor sheet is finished at the image read-out section 20.

On the other hand, the erased reusable stimulable phosphor sheet 1 which has passed through the erasing section 30 after the image read-out was finished is conveyed in th direction as indicated by the arrow into the stacker 70. Therefore, both the image-recorded stimulable phosphor sheets 1, 1, . . . and the erased reusable stimulable phosphor sheets 1, 1, . . . may be present in the stacker 70. In the case where some erased reusable stimulable phosphor sheets 1, 1, . . . are housed in the stacker 70 in this manner, the erased reusable stimulable phosphor sheet 1 can be conveyed into the empty cassette 2 immediately after the image-recorded stimulable phosphor sheet 1 was fed out of the cassette 2 at the cassette holding section 10. In this case, the stimulable phosphor sheet 1 conveyed out of the stacker 70 may have often been maintained in the stacker 70 and a long time may have elapsed after the stimulable phosphor sheet 1 was subjected to erasing at the erasing section 30. In the case where at least a predetermined time elapses after the erasing was carried out on the stimulable phosphor sheet 1, the stimulable phosphor sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 1 cause noise in a radiation image recorded next on the stimulable phosphor sheet 1. In order to prevent noise generation, the secondary erasing section 80 for irradiating the erasing light to the stimulable phosphor sheet 1 is disposed in the conveyance path between the stacker 70 and the cassette holding section 10. The erasing light source 81 at the secondary erasing section 80 is turned on only when the stimulable phosphor sheet 1 fed out of the stacker 70 is conveyed toward the cassette holding section 10, thereby to release the radiation energy stored on the stimulable phosphor sheet 1 while the stimulable phosphor sheet 1 is being housed in the stacker 70. The cassette 2 loaded with the erased reusable stimulable phosphor sheet 1 in this manner is taken out of the read-out apparatus for reuse in image recording. In the case where the stacker 70 is provided, take-out of the stimulable phosphor sheet 1 from the cassette 2 and conveyance of the stimulable phosphor sheet 1 into the cassette 2 can be carried out quickly, and processing of the stimulable phosphor sheets can be carried out efficiently.

As the recording sheet, besides the ordinary silver halide photographic film, a dry silver suitable for heat development or the like may be used. Also, besides the photosensitive recording materials, a heat-sensitive recording material may also be used. As the development process in the case where the silver halide photographic film is used, a wet development process, an instant process or the like may be used.

Figure 3:
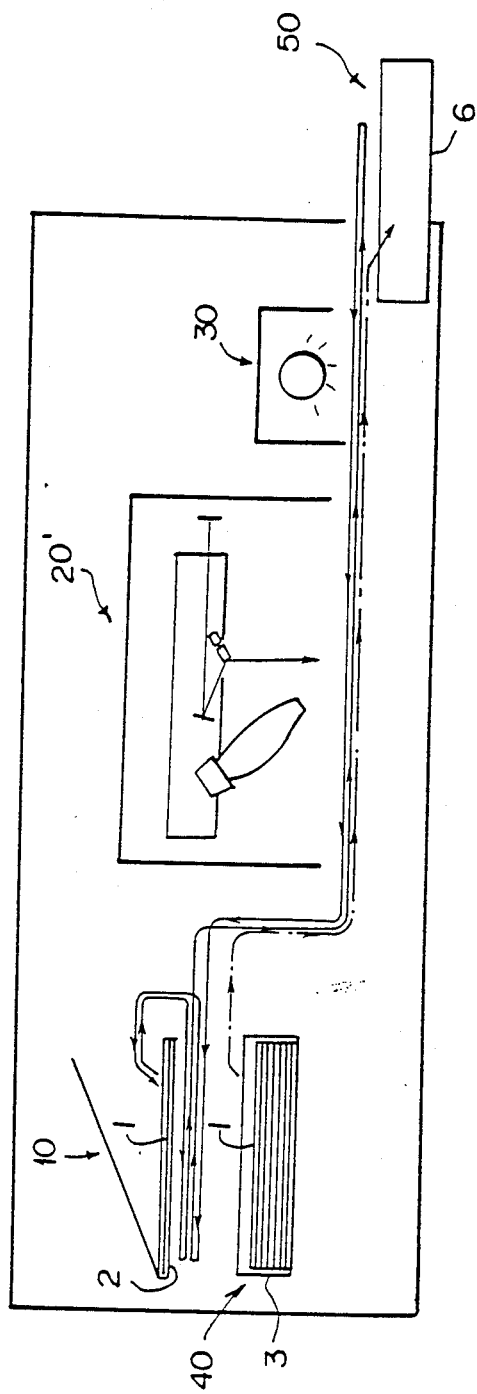

Though the aforesaid embodiments are constituted to carry out the image reproduction besides the image read-out and erasing, the radiation image read-out apparatus in accordance with the present invention may be constituted to carry out only the image read-out and erasing. Also, the layout of the respective sections and the conveyance system are not limited to those in the aforesaid embodiments. For example, as shown in FIG. 3, the apparatus may be composed of the cassette holding section 10, an image read-out section 20', the erasing section 30, the magazine holding section 40', and the tray holding section 50 besides the stimulable phosphor sheet conveyance means (not shown), the stimulable phosphor sheet 1 taken out of the cassette 2 may be conveyed as indicated by the solid line, and the stimulable phosphor sheet 1 taken out of the magazine 3 may be conveyed as indicated by the chain line. In this case, the image read-out section 20' is constituted for carrying out only the image read-out.

Also, in the aforesaid embodiments, the stimulable phosphor sheet 1 taken out of the cassette 2 is returned to the cassette 2 after the image read-out and erasing have been finished, and the stimulable phosphor sheet 1 taken out of the magazine 3 is housed in the tray 6 after the image read-out and erasing have been finished. However, the stimulable phosphor sheet 1 taken out of the cassette 2 may be housed in the tray after the image read-out and erasing have been finished, and the stimulable phosphor sheet 1 taken out of the magazine 3 may be conveyed into the cassette 2 after image read-out and erasing have been finished.

I claim:

1. A radiation image read-out apparatus comprising:
   (i) a cassette holding section for releasably holding a cassette which houses therein a stimulable phosphor sheet carrying a radiation image stored thereon, said cassette holding section being provided with a take-out means for taking said stimulable phosphor sheet out of said cassette.
   (ii) a magazine holding section for releasably holding a magazine which houses a plurality of stimulable phosphor sheets each carrying a radiation image stored thereon, said magazine holding section being provided with a take-out means for taking said stimulable phosphor sheets one by one out of said magazine,
   (iii) an image read-out section for carrying out radiation image read-out by scanning said stimulable phosphor sheet by a light beam which causes said stimulable phosphor sheet to emit light carrying said radiation image stored on said stimulable phosphor sheet, and detecting the emitted light, (iv) an erasing section for erasing radiation energy remaining on said stimulable phosphor sheet after the radiation image read-out from said stimulable phosphor sheet is finished at said image read-out section.

(v) a tray holding section for releasably holding a tray for housing therein a plurality of said stimulable phosphor sheets on which the erasing has been finished, and (vi) a stimulable phosphor sheet conveyance means for:

(a) receiving the stimulable phosphor sheet from said take-out means at said cassette holding section, conveying said stimulable phosphor sheet to said image read-out section and said erasing section, and then conveying said stimulable phosphor sheet into said cassette at said cassette holding section or into said tray at said tray holding section, and (b) receiving the stimulable phosphor sheet from said take-out means at said magazine holding section, conveying said stimulable phosphor sheet to said image read-out section and said erasing section, and then conveying said stimulable phosphor sheet into said tray at said tray holding section or into said cassette at said cassette holding section, wherein the length of said erasing section in the direction of conveyance of said stimulable phosphor sheet is shorter than the length of a single stimulable phosphor sheet, said erasing section and said tray at said tray holding section are providing adjacent to each other so that said tray supports the leading edge of said stimulable phosphor sheet conveyed at said erasing section, and said stimulable phosphor sheet conveyance means conveys said stimulable phosphor sheet, on which the erasing has been finished, by switch-back into said cassette at said cassette holding section, and wherein said erasing section and said tray are disposed at one end of said conveyance means.

2. An apparatus as defined in claim 1 wherein said image read-out section is constituted for acting in the same manner as an image reproducing section for reproducing said radiation image as a visible image on a recording sheet.

3. An apparatus as defined in claim 1 wherein said light beam is a laser beam.

4. A radiation image read-out apparatus comprising:

(i) a cassette holding section for releasably holding a cassette which houses therein a stimulable phosphor sheet carrying a radiation image stored thereon, said cassette holding section being provided with a take-out means for taking said stimulable phosphor sheet out of said cassette, (ii) a magazine holding section for releasably holding a magazine which houses a plurality of stimulable phosphor sheets each carrying a radiation image stored thereon, said magazine holding section being provided with a take-out means for taking said stimulable phosphor sheets one by one out of said magazine, (iii) an image read-out section for carrying out radiation image read-out by scanning said stimulable phosphor sheet by a light beam which causes said stimulable phosphor sheet to emit light carrying said radiation image stored on said stimulable phosphor sheet, and detecting the emitted light, (iv) an erasing section for erasing radiation energy remaining on said stimulable phosphor sheet after the radiation image read-out from said stimulable phosphor sheet is finished at said image read-out section, (v) a stacker capable of housing therein a plurality of stimulable phosphor sheets and discharging said housed stimulable phosphor sheets one by one.

(vi) a tray holding section for releasably holding a tray for housing therein a plurality of said stimulable phosphor sheets on which the erasing has been finished and, (vii) a stimulable phosphor sheet conveyance means for:

(a) receiving the stimulable phosphor sheet from said take-out means at said cassette holding section, conveying said stimulable phosphor sheet into said stacker, conveying the stimulable phosphor sheet fed out of said stacker to said image read-out section and said erasing section and then into said stacker, and conveying the stimulable phosphor sheet discharged from said stacker into said cassette at said cassette holding section or into said tray at said tray holding section, and (b) receiving the stimulable phosphor sheet from said take-out means at said magazine holding section, conveying said stimulable phosphor sheet to said image read-out section and said erasing section, and then conveying said stimulable phosphor sheet into said tray at said tray holding section or into said cassette at said cassette holding section, wherein the length of said erasing section in the direction of conveyance of said stimulable phosphor sheet is shorter than the length of a single stimulable phosphor sheet, said erasing section and said tray at said tray holding section are provided adjacent to each other so that said tray supports the leading edge of said stimulable phosphor sheet conveyed at said erasing section, and said stimulable phosphor sheet conveyance means conveys said stimulable phosphor sheet, on which the erasing has been finished, by switch-back into said cassette at said cassette holding section, and wherein said erasing section and said tray are disposed at one end of said conveyance means.

5. An apparatus as defined in claim 4 wherein said image read-out section is constituted for acting in the same manner as an image reproducing section for reproducing said radiation image as a visible image on a recording sheet.

6. An apparatus as defined in claim 5 wherein said light beam is a laser beam.

* * * * *